(12) United States Patent
Gonzaga et al.

(10) Patent No.: US 10,101,194 B2
(45) Date of Patent: Oct. 16, 2018

(54) SYSTEM AND METHOD FOR IDENTIFYING AND RECOVERING FROM A TEMPORARY SENSOR FAILURE

(71) Applicant: General Electric Company, Schenectady, NY (US)

(72) Inventors: Carlos Gonzaga, Rio de Janeiro (BR); Luca Parolini, Moosburg a.d. Isar (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 153 days.

(21) Appl. No.: 14/985,816

(22) Filed: Dec. 31, 2015

(65) Prior Publication Data

US 2017/0191862 A1  Jul. 6, 2017

(51) Int. Cl.
*G01P 21/00* (2006.01)
*G01F 25/00* (2006.01)

(52) U.S. Cl.
CPC .................. *G01F 25/0007* (2013.01)

(58) Field of Classification Search
CPC .................................................. G01F 25/0007
See application file for complete search history.

(56) References Cited

U.S. PATENT DOCUMENTS 3,913,398 A    10/1975  Curtis
4,162,438 A *   7/1979  Osder ................. G05B 9/03
                                                244/194
5,966,311 A    10/1999  Stemporzewski, Jr. et al.
5,983,164 A    11/1999  Ocondi
6,352,001 B1    3/2002  Wickert et al.
(Continued)

FOREIGN PATENT DOCUMENTS

WO    20070116008 A1   10/2007
WO     2008093054 A2    8/2008
(Continued)

OTHER PUBLICATIONS

Wang et al., "A Smooth Variable Structure Filter State Estimation", Control and Intelligent Systems, vol. No. 35, Issue No. 4, pp. 386-394, 2007.
(Continued)

*Primary Examiner* — Eric S McCall
*Assistant Examiner* — Mohammed E Keramet-Amircola
(74) *Attorney, Agent, or Firm* — GE Global Patent Operation; Pabitra Chakrabarti

(57) ABSTRACT

A sensor system for identifying a transient sensor failure in an industrial system and for recovering from an erroneous estimation of an expected mass flow rate resulting from the transient sensor failure. The sensor system includes one or more sensors for measuring at least one fluid property of the industrial system. The sensor system includes an enhanced flow soft sensing (EFSS) computing device configured to determine an estimated mass flow rate. The EFSS computing device is also configured to generate expected measurements to be received from one or more sensors. If an error value is not within predetermined parameters, the transient sensor failure is detected. The EFSS computing device is further configured to identify a resurgence of the sensor from the transient sensor failure. An erroneous expected mass flow rate then converges toward a correct expected mass flow rate.

21 Claims, 4 Drawing Sheets

(56) References Cited

U.S. PATENT DOCUMENTS

| | | |
|---|---|---|
| 6,484,816 B1 | 11/2002 | Koederitz |
| 6,546,811 B2 | 4/2003 | Fincke |
| 6,755,261 B2 | 6/2004 | Koederitz |
| 6,772,082 B2 | 8/2004 | Van Der Geest et al. |
| 6,941,254 B2 | 9/2005 | Duret et al. |
| 7,054,764 B2 | 5/2006 | Williams et al. |
| 7,216,055 B1 | 5/2007 | Horton et al. |
| 7,336,168 B2 | 2/2008 | Kates |
| 7,474,969 B2 | 1/2009 | Poulisse |
| 7,490,473 B2 * | 2/2009 | Jammu ............ F25B 9/14 62/6 |
| 7,654,151 B2 | 2/2010 | Agar et al. |
| 7,674,624 B2 | 3/2010 | Stephenson et al. |
| 7,725,301 B2 | 5/2010 | Shah et al. |
| 8,027,793 B2 | 9/2011 | Ellender et al. |
| 8,073,665 B2 | 12/2011 | Watters et al. |
| 8,136,414 B2 | 3/2012 | Steven |
| 8,170,801 B2 | 5/2012 | Foot et al. |
| 8,244,509 B2 | 8/2012 | Banerjee et al. |
| 8,452,551 B2 | 5/2013 | Gysling |
| 2004/0030417 A1 * | 2/2004 | Gribble ............ G05B 9/02 700/29 |
| 2004/0084180 A1 * | 5/2004 | Shah ............ E21B 47/10 166/250.16 |
| 2006/0162466 A1 | 7/2006 | Wargo et al. |
| 2007/0068672 A1 | 3/2007 | Jalali et al. |
| 2007/0192046 A1 | 8/2007 | Hairston |
| 2007/0213963 A1 | 9/2007 | Jalali et al. |
| 2008/0300802 A1 | 12/2008 | Lakhani et al. |
| 2009/0112491 A1 | 4/2009 | Nakada et al. |
| 2009/0149969 A1 | 6/2009 | Slupphaug et al. |
| 2009/0173494 A1 | 7/2009 | Tarvin et al. |
| 2009/0293634 A1 | 12/2009 | Ong |
| 2009/0308601 A1 | 12/2009 | Poe, Jr. et al. |
| 2010/0023269 A1 | 1/2010 | Yusti et al. |
| 2010/0094569 A1 | 4/2010 | Gysling |
| 2010/0305883 A1 * | 12/2010 | Danzy ............ F16K 17/04 702/50 |
| 2010/0324873 A1 | 12/2010 | Cameron |
| 2011/0040485 A1 | 2/2011 | Ong |
| 2011/0199094 A1 * | 8/2011 | Lou ............ G01N 33/0006 324/548 |
| 2011/0226469 A1 | 9/2011 | Lovell et al. |
| 2011/0307104 A1 * | 12/2011 | Smirnov ............ G05D 7/0635 700/282 |
| 2012/0209542 A1 | 8/2012 | Gysling |
| 2013/0008235 A1 | 1/2013 | Nilsson |
| 2013/0233079 A1 | 9/2013 | Swartz et al. |
| 2014/0012791 A1 * | 1/2014 | Grichnik ............ G06N 99/005 706/46 |
| 2014/0108359 A1 | 4/2014 | Banaei-Kashani et al. |
| 2015/0185716 A1 * | 7/2015 | Wichmann ............ F01K 23/101 700/287 |
| 2016/0147204 A1 * | 5/2016 | Wichmann ............ G05F 1/66 700/287 |

FOREIGN PATENT DOCUMENTS

| | | |
|---|---|---|
| WO | 2009019591 A2 | 2/2009 |
| WO | 2015101856 A2 | 7/2015 |

OTHER PUBLICATIONS

PCT Search Report and Written Opinion issued in connection with corresponding PCT Application No. PCT/US2016/067889 dated Mar. 14, 2017.

Habibi et al., "The Smooth Variable Structure Filter", Proceedings of the IEEE, vol. 95, Issue: 5, pp. 1026-1059, May 2007.

Toskey, "Improvements to Deepwater Subsea Measurements RPSEA Program: Evaluation of Flow Modelling", Offshore Technology Conference, Apr. 30-May 3, 2012, Houston, Texas, USA.

Wang et al., "A Smooth variable structure filter state estimation", Control and Intelligent Systems, vol. 35, Issue 4, pp. 386-394, 2007.

* cited by examiner

SYSTEM AND METHOD FOR IDENTIFYING AND RECOVERING FROM A TEMPORARY SENSOR FAILURE

BACKGROUND

The field of the disclosure relates generally to oil and gas production systems, and more particularly to a system and method for resiliency against transient sensor failures in oil and gas production systems.

Oil and gas production systems typically contain sensors for measuring physical properties of oil and gas flow. One known method for measuring flow is using a flow soft sensor, which receives distributed measurement data on pressure and temperature from a production system and from that data, estimates the well and pipeline flow rates using a physics-based model.

Many known sensors in petroleum production systems become inaccurate after some time in operation, which requires service. Such decreases in service life are mainly due to the harsh conditions under which such equipment is operated, such as high pressure, high temperature, and/or corrosive environments present proximate or within the production system. A transient sensor failure occurs when sensor measurements contain faulty data for a limited, but sporadic, amount of time.

One known approach to resolve the issue of sporadic sensor failures has been to define a set of parameters for a particular sensor. Such a set of parameters may be constant over time, e.g., the operator may specify a static minimal value and a static maximal value. The set of parameters may also depend on historical measurement data, e.g., the operator may specify a maximal rate of change. It is often difficult to specify an allowable set of parameters for all ranges of a particular measurement over the full range of operation. For example, the set of values must have parameters set sufficiently wide to facilitate capturing measurements during transient conditions. Also, for example, the set of values must have parameters set sufficiently narrow to facilitate distinguishing between expected measurements and unexpected erroneous measurements indicating transient sensor failures. As such, the allowable set of values must have a range sufficiently large to accommodate a wide variety of possible operating conditions of the system, which can be considerable in number and extent, without masking sporadic sensor failures.

BRIEF DESCRIPTION

In one aspect, a sensor system for identifying a transient sensor failure in an industrial system and recovering from an erroneous estimation of an expected mass flow rate resulting from the transient sensor failure is provided. The sensor system includes one or more sensors for measuring at least one fluid property of the industrial system. The sensor system includes an enhanced flow soft sensing (EFSS) computing device configured to determine an estimated mass flow rate. The EFSS computing device includes a processor and a memory coupled to the processor. The EFSS computing device is in communication with the one or more sensors. The EFSS computing device is configured to generate, based on at least a historical estimated mass flow rate and a correction term, an expected mass flow rate. The EFSS computing device is also configured to generate, based on at least the expected mass flow rate, expected measurements to be received from the one or more sensors. The EFSS computing device is further configured to receive measurements from the one or more sensors. The EFSS computing device is also configured to compare the expected measurements with the measurements received from the one or more sensors to determine an error value. The EFSS computing device is further configured to compare the error value to predetermined parameters. If the error value is not within the predetermined parameters, the transient sensor failure is detected, thereby generating an erroneous estimation of the expected mass flow rate. The EFSS computing device is also configured to identify a resurgence of the sensor from the transient sensor failure. The erroneous expected mass flow rate converges toward a correct (i.e., true) expected mass flow rate.

In a further aspect, a method for identifying transient sensor failure in an industrial system and recovering from an erroneous estimation of an expected mass flow rate resulting from the transient sensor failure is provided. The method is implemented using an enhanced flow soft sensing (EFSS) computing device configured to determine an estimated mass flow rate. The method includes generating, based on at least a historical estimated mass flow rate and a correction term, an expected mass flow rate. The method also includes generating, based on at least the expected mass flow rate, expected measurements to be received from one or more sensors. The method further includes receiving measurements from the one or more sensors. The method also includes comparing the expected measurements with the measurements received from the one or more sensors to determine an error value. The method further includes comparing the error value to predetermined parameters. If the error value is not within the predetermined parameters, the transient sensor failure is detected, thereby generating the erroneous estimation of the expected mass flow rate. The method also includes identify a resurgence of the sensor from the transient sensor failure. The erroneous expected mass flow rate converges toward the correct expected mass flow rate.

In another aspect, an enhanced flow soft sensing (EFSS) computing device configured to detect a transient sensor failure in an industrial system and recover from an erroneous estimation of an expected mass flow rate resulting from the transient sensor failure is provided. The EFSS computing device is further configured to determine an estimated mass flow rate. The EFSS computing device includes a processor in communication with a memory and one or more sensors. The processor is configured to generate, based on at least a historical estimated mass flow rate and a correction term, an expected mass flow rate. The processor is further configured to generate, based on at least the expected mass flow rate, expected measurements to be received from the one or more sensors. The processor is also configured to receive measurements from the one or more sensors. The processor is further configured to compare the expected measurements with the measurements received from the one or more sensors to determine an error value. The processor is also configured to compare the error value to predetermined parameters. If the error value is not within the predetermined parameters, the transient sensor failure is detected, thereby generating the erroneous estimation of the expected mass flow rate. The processor is also configured to identify a resurgence of the sensor from the transient sensor failure. The erroneous expected mass flow rate converges toward the correct expected mass flow rate.

DRAWINGS

These and other features, aspects, and advantages of the present disclosure will become better understood when the following detailed description is read with reference to the accompanying drawings in which like characters represent like parts throughout the drawings, wherein.

Figure 1:
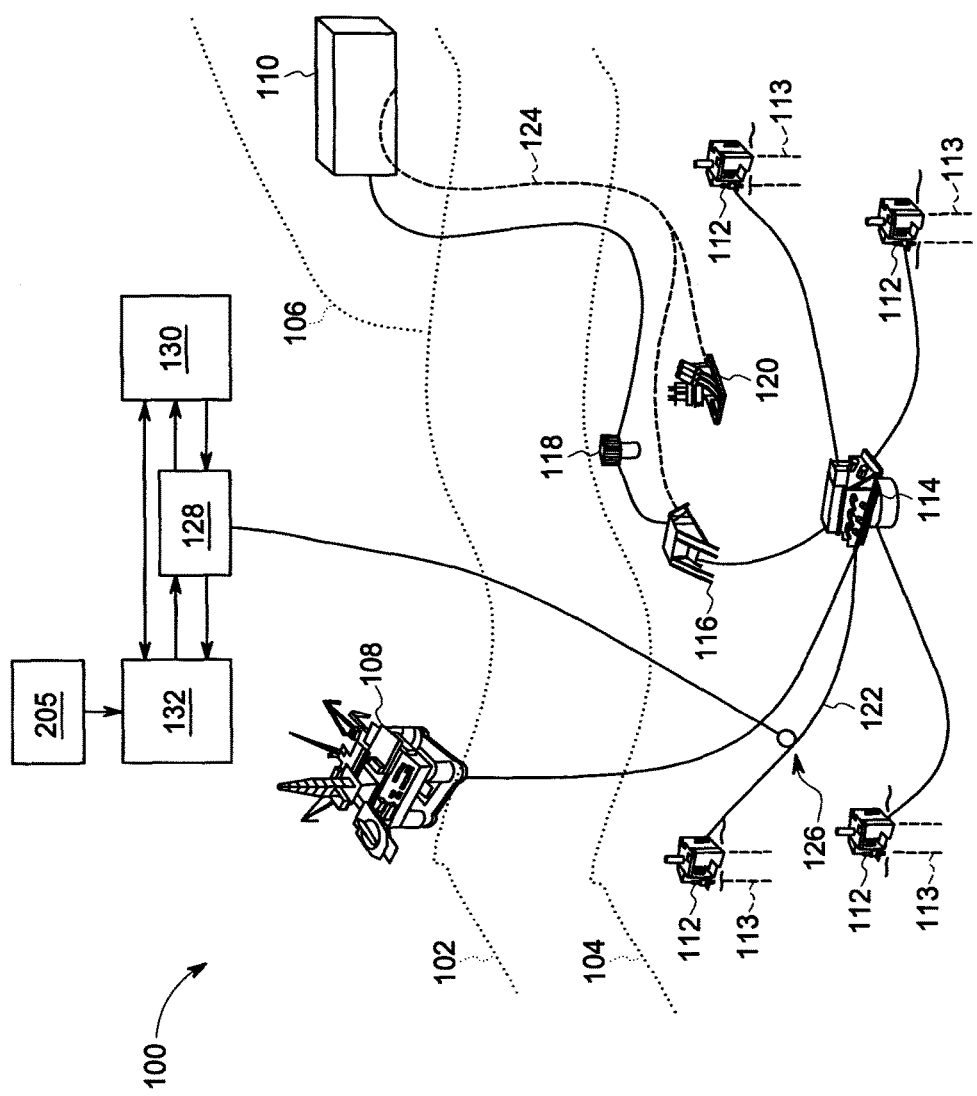
FIG. 1 is a diagram of an exemplary sub-sea oil and gas production system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer", and related terms, e.g., "processing device", "computing device", and controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The enhanced flow soft sensing (EFSS) system described herein provides a method for identifying a transient sensor failure based on a smooth variable structured filter and for converging to a correct estimated state once the transient sensor failure has concluded. Specifically, the embodiments described herein include an EFSS device coupled to at least one measurement sensor. The EFSS device is configured to receive a plurality of signals containing measurement vectors from the sensor to determine an estimated mass flow rate (i.e., the estimated state). A measurement vector includes a list of measurements made by a sensor on a specific fluid (e.g., crude oil). The EFSS device monitors and detects a transient sensor failure in the system by checking a consistency of an actual measurement vector received from the sensor against an expected measurement vector generated by the EFSS device. The transient sensor failure results in an erroneous measurement vector from the sensor and therefore, an erroneous estimation of the expected mass flow rate. The EFSS system adapts by neglecting an effect of the faulty sensor measurements on the estimated mass flow rate by converging back to a correct estimated mass flow rate. The EFSS system typically converges faster to the correct estimated mass flow rate than other types of known filters.

FIG. 1 is a diagram of an exemplary sub-sea oil and gas production system 100. Production system 100 includes elements at a water surface 102, at a sea floor 104, and on land 106. Production system 100 includes, without limitation, a platform 108 at water surface 102. Production system 100 also includes, without limitation, a topside facility 110 at land 106. The sub-sea portion of production system 100 includes, at sea floor 104, and without limitation, well heads 112, a manifold 114, a separator 116, a booster 118, and a power station 120. The various elements of production system 100 are interconnected by pipelines 122 and power transmission lines 124.

Well heads 112 extract fluid (not shown) from a sub-sea reservoir (not shown). The fluid generally includes oil, gas, water, and other by-products. Alternative embodiments include additional well heads 112. Other embodiments include fewer well heads 112. Well heads 112, in certain embodiments, also carry out various processes that can include, without limitation, injecting a compressed fluid into the reservoir to increase well pressure. Fluids extracted by well heads 112 are routed to manifold 114 via pipelines 122.

Manifold 114 gathers and routes extracted fluids from well heads 112. Manifold 114 may also receive processed fluids (not shown) from other sub-sea equipment, including and without limitation, separator 116 and booster 118. Manifold 114 may direct fluids to other elements of production system 100, including and without limitation platform 108, separator 116, booster 118, and topside facility 110.

Separator 116 receives and processes extracted fluid to separate the oil and gas from other fluids or elements, including and without limitation, water and sand. Separator 116 carries out liquid-liquid separation to separate oil from water. In addition, separator 116 carries out gas-liquid separation to separate gas from oil and water. Separator 116 includes one or more separation stages to carry out the various aspects of separation. Each stage of separator 116 includes one or more types of separators, including and without limitation, gravity based separators, centrifugal based separators, and electrostatic separators. The products of separator 116 are routed to various other equipment for reuse, storage, or further processing. For example, and without limitation, water separated from the oil and gas, which is sometimes referred to as produced water, may be transported away or reintroduced to the sea. Separated oil and gas is routed to other equipment for processing, to platform 108 at water surface 102, or to topside facility 110.

Booster 118 facilitates transport of fluids from sea floor 104 to water surface 102 or land 106. When production system 100 includes well heads 112 and various other equipment at depth, it is sometimes necessary to include one or more boosters 118 to force the fluids up to their destination, which may include, without limitation, platform 108 or topside facility 110.

Well heads 112, manifold 114, separator 116, and booster 118 generally require some amount of power to operate. Power station 120 includes one or more transformers, switch gear, and other power distribution components (all not shown) to deliver the appropriate power to the various elements of production system 100. Power station 120 utilizes topside facility 110 as its power source, which includes, without limitation, a generator, a variable frequency drive, transformers, switch gear, and other power distribution components (all not shown) for generating the required power. Topside facility 110 delivers the source power to power station 120 via power transmission line 124. Power transmission line 124, in certain embodiments, is included in a sub-sea umbilical that couples topside facility 110 to the sub-sea portion of production system 100.

A number of sensors are located in production system 100. For reservoir evaluation and environmental reasons, monitoring of the subsea well 113 is performed remotely. This remote monitoring requires transmission of data from subterranean sensors in the well. The sensors or sensor locations are adapted to measure a parameter of interest, such as temperature, distributed temperature, pressure, acoustic energy, electric current, magnetic field, electric field, flow, chemical properties, or a combination thereof. The sensors may be fiber optic sensors, electrical sensors, or other types of sensors.

Such sensors include pressure gauges, temperature gauges, multi-phase flow meters, densitometers, and water cut meters. In one embodiment, these sensors are connected to a process control system 128 (also known as a subsea control system) that is connected to a topside control system or computer, described below. The sensors measure any of the following properties of a fluid inside a pipe or any other pressure containing equipment: absolute pressure, differential pressure, temperature, density (e.g., nucleonic densitometers), phase fractions (e.g., fluid dielectricity, capacitance and impedance meters), molecular compositions, salinity (e.g., with conductivity meters and or nucleonic densitometers), velocity, and momentum. In some known systems, a flow rate in an oil well or gas well is found by measuring pressure variations and/or temperature variations in certain parts of the well and by identifying the flow rate that is most consistent with the measured pressure and/or temperature drop according to a model of the flow.

Sensors 126 (only one sensor shown in FIG. 1) transmit measurements to a process control system 128 operating under control of an operator station 130 and exchanging sensor readings and results. A well monitoring data processing system 132 in communication with operator station 130 also exchanges instructions and receives sensor readings from process control system 128. A computing device 205 monitors sensors 126 for transient sensor failures. In some embodiments, computing device 205 is at least part of well monitoring data processing system 132. In alternative embodiments, computing device 205 is remote from well monitoring data processing system 132.

Figure 2:
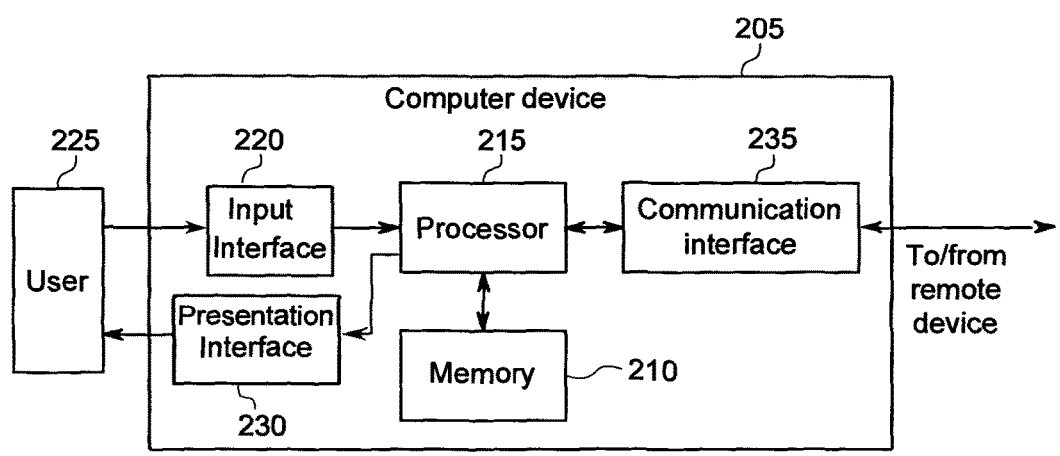
FIG. 2 is a block diagram of an exemplary computing device that is used for identifying transient sensor failure in the sub-sea oil and gas production system shown in FIG. 1.

FIG. 2 is a block diagram of exemplary computing device 205, such as an EFSS (enhanced flow soft sensing) device, that is used to detect a transient sensor failure in oil and gas production system 100 (shown in FIG. 1) and converge to a correct estimated state once the transient sensor failure has concluded. Computing device 205 includes a memory device 210 and a processor 215 operatively coupled to memory device 210 for executing instructions. In some embodiments, executable instructions are stored in memory device 210. Computing device 205 is configurable to perform one or more operations described herein by processor 215. For example, processor 215 may be programmed by encoding an operation as one or more executable instructions and providing the executable instructions in memory device 210. Processor 215 may be configured to operate in real time, i.e., during the operation of the system, without introducing a delay into the operation of the system. In the exemplary embodiment, memory device 210 is one or more devices that enable storage and retrieval of information such as executable instructions and/or other data. Memory device 210 may include one or more computer readable media.

In some embodiments, computing device 205 also includes sufficient computer-readable/executable instructions, data structures, program modules, and program submodules, to receive measurement data transmitted from a sensor. Further, alternatively, computing device 205 is any computer-based system that monitors a sensor and detects a sensor failure.

In the exemplary embodiment, memory device 210 is one or more devices that enable storage and retrieval of information such as executable instructions and/or other data. Memory device 210 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Memory device 210 is configured to store measurements including, without limitation, pressure measurements, temperature measurements, error measurements, and vector measurements. Memory device 210 further includes, without limitation, sufficient data, algorithms, and commands to provide a computer-based process model for generating an expected measurement vector for a sensor measurement and comparing the expected measurement vector with an actual measurement vector from a sensor. Also, memory device 210 includes, without limitation, sufficient data, algorithms, and commands to receive a measurement vector signal from a sensor, transmit a vector signal to a remote device, determine an expected measurement vector, determine an estimated state vector, determine an expected state vector, determine a correction term, determine an error estimate, and detect a transient sensor failure.

In some embodiments, computing device 205 includes a presentation interface 220 coupled to processor 215. Presentation interface 220 presents information, such as a user interface, to a user 225. In some embodiments, presentation interface 220 includes one or more display devices. Also, in some embodiments, computing device 205 includes a user input interface 230. In the exemplary embodiment, user input interface 230 is coupled to processor 215 and receives input from user 225. In one or more embodiments, when a sensor failure is detected, a notification is transmitted to presentation interface 220 and/or user 225.

A communication interface 235 is coupled to processor 215 and is configured to be coupled in communication with one or more other devices, such as one or more sensors 126 (shown in FIG. 1), well monitoring data processing system 132 (shown in FIG. 1), or another computing device 205, and to perform input and output operations with respect to such devices while performing as an input channel. Communication interface 235 receives data from and/or transmits data to one or more remote devices. For example, a communication interface 235 of one computing device 205 receives vector measurements from the sensor. In some embodiments, communication interface 235 is a wireless interface.

Figure 3:
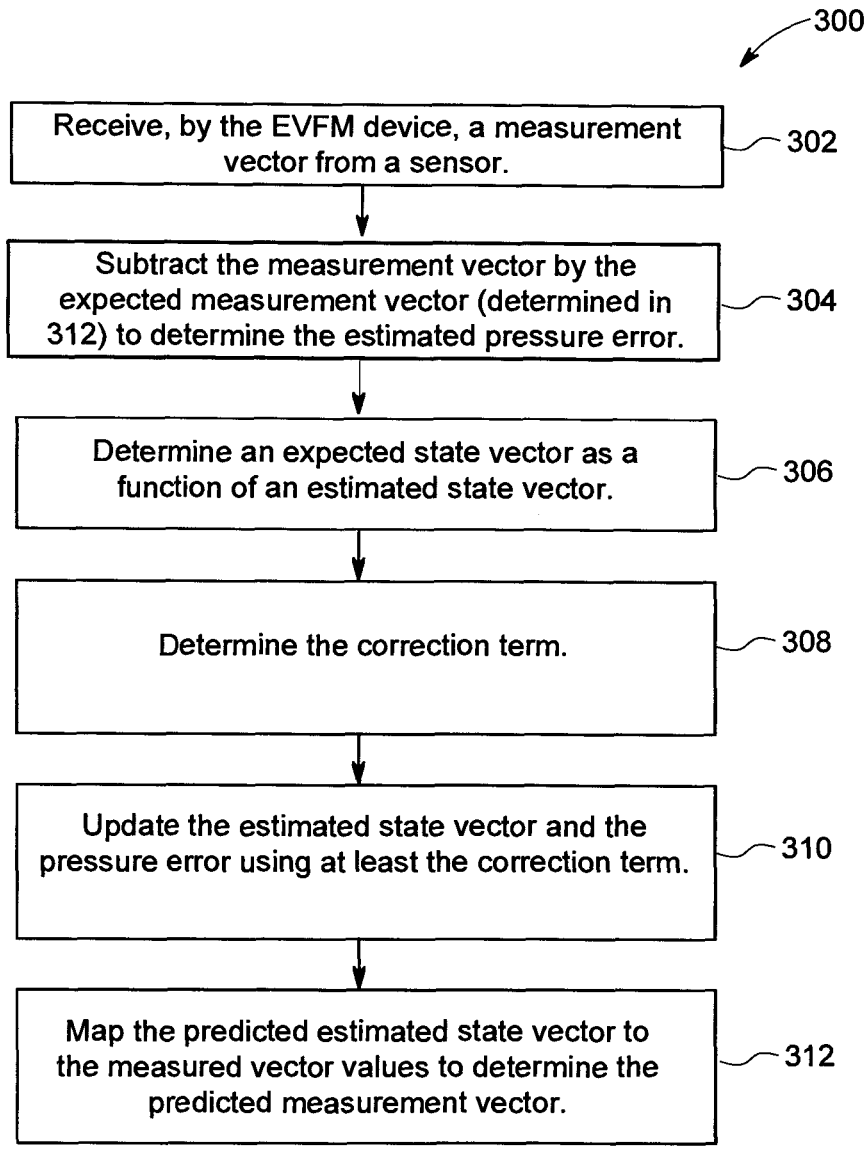
FIG. 3 is a flow chart of an method for identifying transient sensor failure using the computing device shown in FIG. 2.

FIG. 3 is a flow chart of an exemplary method 300 using a sensor system 301, including EFSS computing device 205 (shown in FIG. 2), for monitoring and identifying a transient sensor failure, and for neglecting the effect of the transient sensor failure on estimating a mass flow rate and quickly converging back to the correct estimated mass flow rate. Sensor system 301 is based upon a smooth variable structure filter (SVSF). The SVSF is a predictor-corrector filter for state estimation based on a sliding mode control concept. It uses a projection of a system state trajectory (i.e., the correct states) and forces the estimated state time evolution to stay close to the system state trajectory, thus reducing the effects of noise and modeling errors. A correction term, described below, is applied to estimated states such that these are directed towards the system state trajectory and pushed across it. As the estimated states cross the system state trajectory, the correction term reverses in direction forcing the estimated states back towards the system state trajectory. While this switching action takes place, the correction term is structured to reduce a magnitude of an estimation error.

The estimated states are propagated via a selected dynamic model based on specific knowledge of the field or on best practice in estimation for oil and gas application that correlates the sensor measurements (e.g., pressure and temperature measurements) with a mass flow rate. The dynamic model may be a surrogate (simplified) model following a physics-based approach, a data-driven approach, or a hybrid approach combining the physics-based approach and the data-driven approach.

At the beginning of the process, initial values of the measurements and estimated states are determined based on probability distributions or designer knowledge, including an estimated state vector (known as $\hat{x}_{k|k}$ after a first cycle) and an expected measurement vector (known as $\hat{y}_{k|k-1}$ after the first cycle).

EFSS computing device 205 is configured to receive a plurality of signals from one or more sensors that include measurements made on a specific fluid (e.g., crude oil). In the exemplary embodiment, the signal includes a vector $y_k$ of measured pressure and temperature values of a fluid, where subscript 'k' is a time index. The measurement vector $y_k$ can be of any needed size. In some alternative embodiments, the signal includes additional values received from one or more sensors.

During operation, EFSS computing device 205 receives 302 a measurement vector $y_k$ from one or more sensors. The measurement vector $y_k$ is subtracted 304 by the expected measurement vector $\hat{y}_{k|k-1}$, defined below, to determine an estimated pressure error $\hat{e}_{k|k-1}$. The estimated pressure error $\hat{e}_{k|k-1}$ is used as an indicator of an error in the estimated state vector. As described further below, this is performed to verify the consistency of measured flow properties. If the expected measurement vector $\hat{y}_{k|k-1}$ is within a predefined specified limit of the actual measurement vector $y_k$, the validity of the measurement vector received from the sensor is confirmed. If such is not the case, a failure of the sensor is indicated. The transient sensor failure results in a generation of one or more erroneous sensor measurements, thereby generating erroneous estimations of the expected mass flow rate. The EFSS computing device 205 is configured to identify a resurgence of the sensor from the transient sensor failure, wherein the erroneous expected mass flow rate converges toward a correct expected mass flow rate.

Using an expected measurement vector relationship $f(\hat{x}_{k|k})$, an expected state vector $\hat{x}_{k+1|k}$ is determined 306 from the last estimated state vector $\hat{x}_{k|k}$. In the exemplary embodiment, the estimated state vector $\hat{x}_{k|k}$ is an estimated mass flow rate based on the temperature and pressure measurements received from the sensor. The expected state vector $\hat{x}_{k+1|k}$ is the expected (i.e., estimated) mass flow rate. In the state vectors, the subscript 'k' refers to the vector at a point in time k, such that $_{k|k}$ is an estimation of the state value at time k, based on measurements available up to time k. The subscript notation $_{k+1}$ is used to refer to an expected state, either in the measurement vector or the state vector. Thus, as an example, $x_{k+1|k}$ is the expected state of the state vector $x_{k+1}$ based on measurement data up to time k.

EFSS computing device 205 determines 308 the correction term K from an internal model and estimated measurement errors. More specifically, the correction term is a function of the measurement errors $\hat{e}_{k|k-1}$ and $\gamma\hat{e}_{k-1|k-1}$, a sign function sign ($\hat{e}_{k|k-1}$), a rate of convergence and the internal model. The internal model correlates measured variables such as temperature and pressure with the expected state vector. The internal model applies equations for balance of mass, momentum, and heat to the flow, where the equations are dependent on spatial-derivative, on time-derivative, or both derivatives (PDE's).

The correction term uses a projection of the correct state trajectory and forces the estimated state trajectories (i.e., estimated state vectors $\hat{x}_{k|k}$) to stay close to the correct states. The correction term is applied to the estimated state vector $\hat{x}_{k|k}$ such that the estimated state vector $\hat{x}_{k|k}$ is directed towards the surface and pushed across it. The objective is to keep the estimated state vectors $\hat{x}_{k|k}$ along this surface in order to minimize trajectory errors (i.e., difference between a desired trajectory and estimated or actual values), which results in an erroneous expected mass flow rate converging toward a correct expected mass flow rate. As the estimated state vectors $\hat{x}_{k|k}$ cross the correct state trajectory, the correction term reverses in direction forcing the estimated state vectors $\hat{x}_{k|k}$ back towards the correct state trajectory. While this switching action takes place, the correction term is structured to reduce a magnitude of the estimation error. EFSS computing device 205 updates 310 the estimated state vector $\hat{x}_{k|k}$ using the correction term K and the expected state vector $\hat{x}_{k+1|k}$. The updated estimated state vector is transmitted as output from EFSS device 205 to a remote device, which can be monitored by a user.

EFSS computing device 205 further updates the estimated pressure error $\hat{e}_{k|k}$ by subtracting an internal model involving the estimated state vector $\hat{x}_{k|k}$ mapped to the measurement vector $y_k$, from the measurement vector $y_k$. The updated estimated pressure error $\hat{e}_{k|k}$ is stored until a next estimation cycle where it is used in the correction term computation.

EFSS computing device 205 includes a mapping function that maps 312 the expected state vector $\hat{x}_{k+1|k}$ to the measured vector values stored in the memory to determine the expected measurement vector $\hat{y}_{k+1|k}$. The expected measured vector $\hat{y}_{k+1|k}$ is the expected vector to be received from a sensor in the system at the beginning of the next cycle.

The above process begins again with EFSS computing device 205 subtracting the expected measurement vector $\hat{y}_{k+1|k}$ provided by the internal model from an actual vector of pressure and temperature measurements $y_k$ received from the sensor to determine an estimated pressure error $\hat{e}_{k|k}$. If the estimated pressure error $\hat{e}_{k|k}$ is within some acceptable parameters, the validity of the measurement vector $y_k$ is confirmed. If such is not the case, a failure of the sensor is indicated. Once the failure of the sensor is no longer indicated, EFSS computing device 205 quickly converges the erroneous estimated state vectors $\hat{x}_{k|k}$ back to the correct estimated state vectors $\hat{x}_{k|k}$. A variation of the sign function involved in the correction term computation enables an aggressive time response to the estimation error. In addition, the gamma parameter involved in the correction term computation enables an extra degree of freedom to set the rate of convergence (i.e., the smaller the gamma parameter, the faster the convergence). This enables the system to quickly recover its estimation capability.

The acceptable parameters are a function of the uncertain dynamics associated with the inaccuracy of the internal model as well as the measurement model, and vary with time.

The above cycle is continually repeated to monitor and detect transient sensor failures.

Historical values of the sensor reading are considered in order to alleviate the impact of sensor noise to the current estimation. If a sensor becomes faulty, its negative impact on the overall estimation is only temporary. As soon as a sensor returns to normal operating mode, the effects of the temporary failure become negligible, even though the whole history of its data is considered in the estimation process. The proposed method therefore is able to mitigate noise superimposed to sensor measurement, while at the same time it offers robustness properties against temporary sensor failure.

For practical applications, it is only necessary to know flow properties in a limited number of selected locations in order to obtain an impression of the behavior of the flow everywhere in the system. For example, in one embodiment, the flow properties are estimated at the inlet and at the outlet of every subsystem of the production system.

Simulating the flow in the production system is in effect knowing the value of all the relevant properties of the flow through the system. Without loss of generality, it suffices to know a set of characterizing properties of the flow, that is, a set of basic properties of the flow from which all other properties may be derived by means of models. In the exemplary embodiment, pressure and temperature measurements are recorded.

Figure 4:
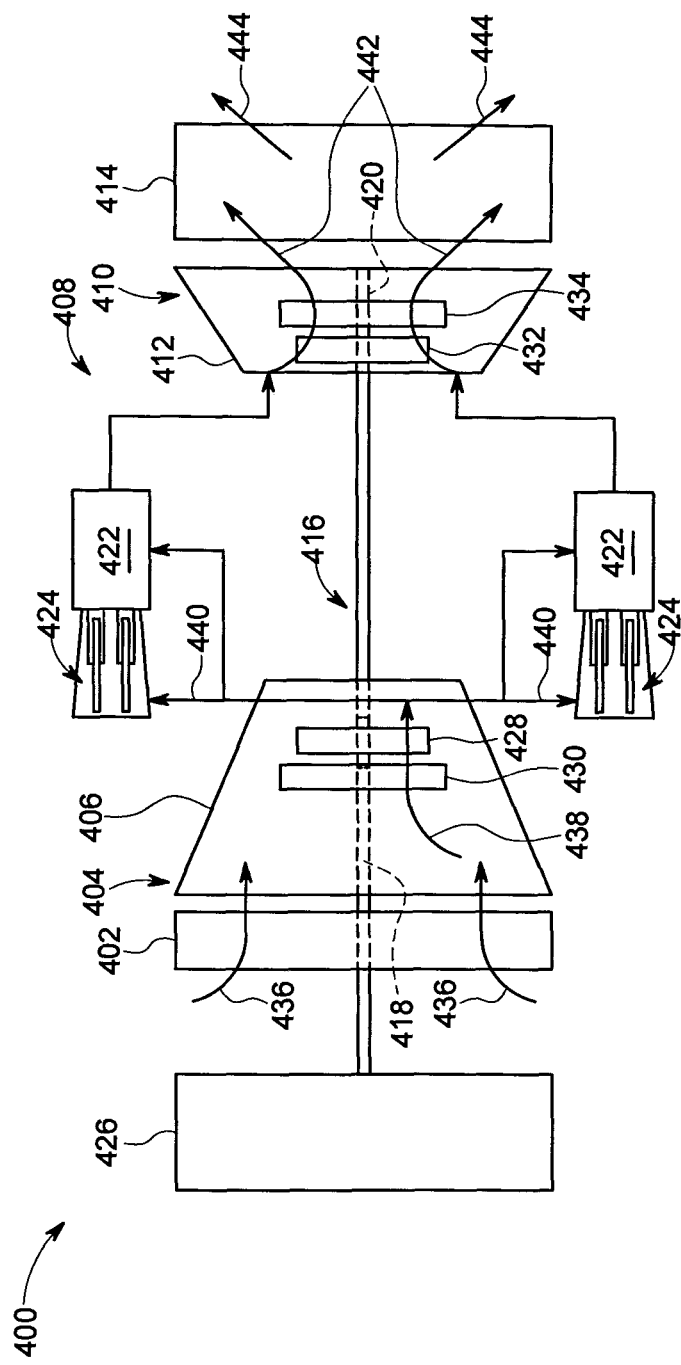
FIG. 4 is a schematic view of a high-temperature asset, i.e., a turbomachine, and more specifically, in the exemplary embodiment, a gas turbine engine that may be used with the computing device shown in FIG. 2.

FIG. 4 is a schematic view of a high-temperature asset, i.e., a turbomachine, and more specifically, in the exemplary embodiment, a gas turbine engine 400 that may be used with the EFSS system and more specifically, EFSS computing device 205 (shown in FIG. 2). Alternatively, transient sensor failures in any high-temperature apparatus, system, and facility may be monitored and detected using a system substantially similar to the EFSS system as described herein, including, without limitation, combustion systems such as fossil-fired furnaces, gasification systems, boilers, steam turbines, and the associated high-temperature exhaust systems.

In the exemplary embodiment, gas turbine engine 400 includes an air intake section 402, and a compressor section 404 that is coupled downstream from, and in flow communication with, intake section 402. Compressor section 404 is enclosed within a compressor casing 406. A combustor section 408 is coupled downstream from, and in flow communication with, compressor section 404, and a turbine section 410 is coupled downstream from, and in flow communication with, combustor section 408. Gas turbine engine 400 is enclosed within a turbine casing 412 and includes an exhaust section 414 that is downstream from turbine section 410. Moreover, in the exemplary embodiment, turbine section 410 is coupled to compressor section 404 via a rotor assembly 416 that includes, without limitation, a compressor rotor, or drive shaft 418 and a turbine rotor, or drive shaft 420.

In the exemplary embodiment, combustor section 408 includes a plurality of combustor assemblies, i.e., combustors 422 that are each coupled in flow communication with compressor section 404. Combustor section 408 also includes at least one fuel nozzle assembly 424. Each combustor 422 is in flow communication with at least one fuel nozzle assembly 424. Moreover, in the exemplary embodiment, turbine section 410 and compressor section 404 are rotatably coupled to a load 426 via drive shaft 418. For example, load 426 may include, without limitation, an electrical generator or a mechanical drive application, e.g., a pump. Alternatively, gas turbine engine 400 may be an aircraft engine. In the exemplary embodiment, compressor section 404 includes at least one compressor blade assembly 428, i.e., blade 428 and at least one adjacent stationary vane assembly 430.

Also, in the exemplary embodiment, turbine section 410 includes at least one turbine blade assembly, i.e., bucket 432 and at least one adjacent stationary nozzle assembly 434. Each compressor blade assembly 428 and each turbine bucket 432 are coupled to rotor assembly 416, or, more specifically, compressor drive shaft 418 and turbine drive shaft 420.

In operation, air intake section 402 channels air 436 towards compressor section 404. Compressor section 404 compresses inlet air 436 to higher pressures and temperatures prior to discharging compressed air 440 towards combustor section 408. Compressed air 440 is channeled to fuel nozzle assembly 424, mixed with fuel (not shown), and burned within each combustor 422 to generate combustion gases 442 that are channeled downstream towards turbine section 410. Combustion gases 442 generated within combustors 422 are channeled downstream towards turbine section 410. After impinging turbine bucket 432, thermal energy is converted to mechanical rotational energy that is used to drive rotor assembly 416. Turbine section 410 drives compressor section 404 and load 426 via drive shafts 418 and 420, and exhaust gases 444 are discharged through exhaust section 414 to ambient atmosphere.

In the exemplary embodiment, gas turbine engine 400 also includes a plurality of sensors, which are disposed in predetermined locations throughout the system. The plurality of sensors includes, but is not limited to, temperature sensors, accelerometers, vibration sensors and pressure sensors. These sensors coupled to the EFSS computing device 205 allow gas turbine engine 400 to be used with the EFSS system to monitor and detect transient failures of sensors. Other dynamic systems that may be used with the EFSS system include, but are not limited to, windmills and downhole systems. Accordingly, ones skilled in the art will be able to determine other dynamic systems with sensors that would benefit from the EFSS system.

The above-described method and system provide for an enhanced flow soft sensing (EFSS) system described herein provides a method for identifying transient sensor failure in an oil and gas production system while tracking slow variations of key fluid properties that are critical to a customer. Specifically, the embodiments described herein include an enhanced flow soft sensing (EFSS) device coupled to at least one measurement sensor. The EFSS device is configured to receive a plurality of vector signals containing pressure and temperature measurements from the measurement sensor and determine an estimated mass flow rate from the measurements. The EFSS device monitors and detects a transient sensor failure in the oil and gas production system by checking a consistency of actual measurements received from the sensor against expected measurements generated by the EFSS device. The transient sensor failure results in an erroneous measurement vector from the sensor and therefore, an erroneous estimation of the expected mass flow rate. The EFSS system adapts by neglecting an effect of the faulty sensor measurements on the estimated mass flow rate by converging back to a correct estimated mass flow rate. The EFSS system typically converges faster to the correct estimated mass flow rate than other types of known filters.

An exemplary technical effect of the methods, systems, and apparatus described herein includes at least one of: (a) using a smooth variable structured filter strategy to detect transient sensor failures; (b) estimating a measurement vector to be received from a sensor; (c) estimating a mass flow rate from measurements received from the sensor; and (d) converging faster from the erroneous estimated mass flow rate to the correct estimated mass flow rate when compared with other types of known filters.

Exemplary embodiments of methods, systems, and apparatus for detecting transient sensor failures are not limited to the specific embodiments described herein, but rather, components of systems and/or steps of the methods may be utilized independently and separately from other components and/or steps described herein. For example, the methods may also be used in combination with other systems requiring in-situ recognition of unusual conditions and the associated methods of detecting transient sensor failures, and are not limited to practice with only the systems and methods as described herein. Rather, the exemplary embodiment can be implemented and utilized in connection with many other applications, equipment, and systems that may benefit from physics-based modeling and control in an operating environment with unusual conditions.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor system for identifying a transient sensor failure in an industrial system and recovering from an erroneous estimation of an expected mass flow rate resulting from the transient sensor failure, the sensor system including one or more sensors for measuring at least one fluid property of the industrial system, the sensor system comprising:

an enhanced flow soft sensing (EFSS) computing device configured to determine an estimated mass flow rate, the EFSS computing device comprising a processor and a memory coupled to the processor, the EFSS computing device in communication with the one or more sensors, the EFSS computing device configured to:
  generate, based on at least a historical estimated mass flow rate and a correction term, an expected mass flow rate;
  generate, based on at least the expected mass flow rate, expected measurements to be received from the one or more sensors;
  receive measurements from the one or more sensors;
  compare the expected measurements with the measurements received from the one or more sensors to determine an error value;
  compare the error value to predetermined parameters, wherein if the error value is not within the predetermined parameters, the transient sensor failure of a sensor is detected, thereby generating the erroneous estimation of the expected mass flow rate; and
  identify a resurgence of the sensor from the transient sensor failure,
  wherein an erroneous expected mass flow rate converges toward a correct expected mass flow rate.

2. The sensor system in accordance with claim 1, wherein the measurements received from the one or more sensors include at least a vector of pressure and temperature measurements.

3. The sensor system in accordance with claim 1, wherein the convergence of the erroneous expected mass flow rate toward the correct expected mass flow rate is based on at least the correction term.

4. The sensor system in accordance with claim 1, wherein the correction term is based upon at least measurement errors and an internal model.

5. The sensor system in accordance with claim 1, wherein the expected measurements are based upon the expected mass flow rate and an internal model.

6. The sensor system in accordance with claim 1, wherein the predetermined parameters are obtained through a probability distribution of a difference between the expected measurements and the measurements received from the one or more sensors.

7. The sensor system in accordance with claim 1, wherein the EFSS computing device is coupled to a user interface, the EFSS computing device further configured to transmit a notification to the user interface that the transient sensor failure was detected.

8. A method for identifying transient sensor failure in an industrial system and recovering from an erroneous estimation of an expected mass flow rate resulting from the transient sensor failure, the method implemented using an enhanced flow soft sensing (EFSS) computing device configured to determine an estimated mass flow rate, the method comprising:
  generating, based on at least a historical estimated mass flow rate and a correction term, an expected mass flow rate;
  generating, based on at least the expected mass flow rate, expected measurements to be received from one or more sensors;
  receiving measurements from the one or more sensors;
  comparing the expected measurements with the measurements received from the one or more sensors to determine an error value;
  comparing the error value to predetermined parameters, wherein if the error value is not within the predetermined parameters, the transient sensor failure of a sensor is detected, thereby generating an erroneous estimation of the expected mass flow rate; and
  identifying a resurgence of the sensor from the transient sensor failure, wherein an erroneous expected mass flow rate converges toward a correct expected mass flow rate.

9. The method in accordance with claim 8, wherein the measurements received from the one or more sensors include at least a vector of pressure and temperature measurements.

10. The method in accordance with claim 8, wherein the convergence of the erroneous expected mass flow rate toward the correct expected mass flow rate is based on at least the correction term.

11. The method in accordance with claim 8, wherein the correction term is based upon at least measurement errors and an internal model.

12. The method in accordance with claim 8, wherein the expected measurements are based upon the expected mass flow rate and an internal model.

13. The method in accordance with claim 8, wherein the predetermined parameters are obtained by means of a probability distribution of a difference between the expected measurements and the measurements received from the one or more sensors.

14. The method in accordance with claim 8, wherein the EFSS computing device is coupled to a user interface, the method further comprising transmitting a notification to the user interface that the transient sensor failure was detected.

15. An enhanced flow soft sensing (EFSS) computing device configured to detect a transient sensor failure in an industrial system and recover from an erroneous estimation of an expected mass flow rate resulting from the transient sensor failure, the EFSS computing device further configured to determine an estimated mass flow rate, the EFSS computing device comprising:
  a processor in communication with a memory and one or more sensors, the processor configured to:
    generate, based on at least a historical estimated mass flow rate and a correction term, an expected mass flow rate;
    generate, based on at least the expected mass flow rate, expected measurements to be received from the one or more sensors;
    receive measurements from the one or more sensors;
    compare the expected measurements with the measurements received from the one or more sensors to determine an error value;
    compare the error value to predetermined parameters, wherein if the error value is not within the predetermined parameters, the transient sensor failure of a sensor is detected, thereby generating an erroneous estimation of the expected mass flow rate; and
    identify a resurgence of the sensor from the transient sensor failure, wherein an erroneous expected mass flow rate converges toward a correct expected mass flow rate.

16. The EFSS computing device in accordance with claim 15, wherein the measurements received from the one or more sensors include at least a vector of pressure and temperature measurements.

17. The EFSS computing device in accordance with claim 15, wherein the convergence of the erroneous expected mass flow rate toward the correct expected mass flow rate is based on at least the correction term.

18. The EFSS computing device in accordance with claim 15, wherein the correction term is based upon at least measurement errors and an internal model.

19. The EFSS computing device in accordance with claim 15, wherein the expected measurements are based upon the expected mass flow rate and an internal model.

20. The EFSS computing device in accordance with claim 15, wherein the predetermined parameters are obtained by means of a probability distribution of a difference between the expected measurements and the measurements received from the one or more sensors.

21. The EFSS computing device in accordance with claim 15, wherein the EFSS computing device is coupled to a user interface, the EFSS computing device further configured to transmit a notification to the user interface that the transient sensor failure was detected.

* * * * *